US007942448B2

United States Patent
Odate et al.

(10) Patent No.: US 7,942,448 B2
(45) Date of Patent: May 17, 2011

(54) VEHICULAR SEATBELT DEVICE

(75) Inventors: Shotaro Odate, Wako (JP); Yo Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/703,375

(22) Filed: Feb. 10, 2010

(65) Prior Publication Data
US 2010/0207444 A1   Aug. 19, 2010

(30) Foreign Application Priority Data
Feb. 13, 2009   (JP) ................................. 2009-032051

(51) Int. Cl.
*B60R 22/34* (2006.01)

(52) U.S. Cl. ........... 280/807; 280/806; 280/808; 701/45
(58) Field of Classification Search .................. 280/803, 280/806, 807, 808; 701/45
See application file for complete search history.

(56) References Cited

U.S. PATENT DOCUMENTS

| 6,702,326 | B1 | 3/2004 | Fujii | |
|---|---|---|---|---|
| 7,341,340 | B2 * | 3/2008 | Schmitt et al. | 347/107 |
| 7,343,999 | B2 * | 3/2008 | Cuddihy et al. | 180/268 |
| 7,600,600 | B2 * | 10/2009 | Inuzuka et al. | 180/272 |
| 7,654,573 | B2 * | 2/2010 | Kudo et al. | 280/806 |
| 7,664,585 | B2 * | 2/2010 | Odate | 701/45 |
| 7,686,340 | B2 * | 3/2010 | Takemura | 280/806 |
| 7,698,038 | B2 * | 4/2010 | Odate | 701/45 |
| 7,712,784 | B2 * | 5/2010 | Ishii | 280/806 |
| 7,766,389 | B2 * | 8/2010 | Odate | 280/806 |
| 7,770,929 | B2 * | 8/2010 | Ehlers | 280/806 |
| 2007/0017726 | A1 | 1/2007 | Takemyura | |

FOREIGN PATENT DOCUMENTS

| JP | 2000-118352 | 4/2000 |
|---|---|---|
| JP | 2007-045207 | 2/2007 |
| JP | 2007-160986 | 6/2007 |

* cited by examiner

*Primary Examiner* — Toan C To
(74) *Attorney, Agent, or Firm* — Rankin, Hill & Clark LLP

(57) ABSTRACT

A vehicular seatbelt device whereby slack in a lap belt is sufficiently eliminated according to a traveling state of a vehicle, and a comfortable ride for a vehicle occupant is maintained. A seatbelt device comprises a belt retraction part and an actuator for driving the belt retraction part. The belt retraction part pulls part of a belt in a direction opposite the direction in which the belt is wound up by a belt reel so as to restrain the vehicle occupant. A controller includes a plurality of pre-set control modes for controlling a motor and the actuator in accordance with the traveling state of the vehicle, and selects and implements one control mode corresponding to the traveling state from among the plurality of control modes. The control modes include a mode for drivably controlling both the motor and the actuator, a mode for drivably controlling only the motor, and a mode for drivably controlling only the actuator.

4 Claims, 9 Drawing Sheets

VEHICULAR SEATBELT DEVICE

FIELD OF THE INVENTION

The present invention relates to an improvement in a vehicle seatbelt device.

BACKGROUND OF THE INVENTION

A technique for suppressing changes in the seated posture of a vehicle occupant has been adopted in vehicle seatbelt devices installed for the purpose of protecting occupants sitting in seats in the vehicle, wherein the vehicle occupant is restrained by the seatbelt during an emergency or when the traveling state is unstable (during abnormal behavior).

A common seatbelt is comprised of a shoulder belt for restraining one shoulder of a vehicle occupant, and a lap belt for restraining the lap of the vehicle occupant. A tongue is provided between the shoulder belt and the lap belt so as to allow the belt to be inserted and moved therethrough. This tongue is installed so as to be capable of detaching from a buckle secured to an anchor. A seatbelt for simultaneously restraining one shoulder and the lap of the vehicle occupant can be wound up by a belt reel. A known example of such a seatbelt device for a vehicle is disclosed in Japanese Patent Application Laid-Open Publication No. 2000-118352.

In the vehicle seatbelt control device disclosed in the 2000-118352 publication, the torque of a motor is transmitted to a belt reel via a clutch, whereby the seatbelt is wound up by the belt reel. The clutch is capable of switching the transmitted torque between continuous and multiple stages in accordance with the manner in which the seatbelt is being used. The restraining force for restraining the vehicle occupant through the seatbelt is varied by the switching of the torque.

Frictional force is created in a reversing part of the belt against the tongue attached to the buckle. Thus, a problem remains with sufficiently taking up the slack in the lap belt by winding in one end of the seatbelt; i.e., the shoulder belt, by means of the belt reel. To deal with this problem, one considered option is that a pre-tensioner for taking in the slack of the lap belt be provided separate from the belt reel.

However, the slack in the lap belt is constantly being taken in. Since this causes the lap of the vehicle occupant to be constantly constricted by the lap belt, it is impractical to maintain a comfortable ride for the vehicle occupant.

SUMMARY OF THE INVENTION

An object of the present invention is to provide a technique whereby it is possible to sufficiently take in the slack in a lap belt in accordance with a traveling state of a vehicle, and also to maintain a comfortable ride for a vehicle occupant.

According to the present invention, there is provided a seatbelt device for a vehicle, which comprises: a belt reel for winding in a belt for restraining a vehicle occupant sitting in a seat; a motor for driving the belt reel; a belt retraction part; an actuator for driving the belt retraction part; a traveling state detector for detecting a traveling state of the vehicle; and a controller for controlling the motor and the actuator, wherein the belt retraction part is designed so as to retract part of the belt in a direction opposite the direction in which the belt is wound up by the belt reel so as to restrain the vehicle occupant, the controller includes a plurality of pre-set control modes for controlling the motor and the actuator in accordance with traveling states to be detected by the traveling state detector and is designed to select and implement one of the control modes corresponding to one of the traveling states actually detected by the traveling state detector, and the control modes include a full drive control mode for drive-controlling both the motor and the actuator, a motor drive control mode for drive-controlling only the motor, and an actuator drive control mode for drive-controlling only the actuator.

In the seatbelt device, the motor and actuator can both be driven, the motor alone can be driven, or the actuator alone can be driven, in accordance with the traveling state of the vehicle as detected by the traveling state detector. For example, by driving both the motor and the actuator, both the slack in the belt over the shoulder of the vehicle occupant and the slack in the belt over the lap can be quickly taken in, and the shoulder and lap can be reliably restrained.

Furthermore, the motor and the actuator can be controlled so that the amount of the belt wound by the belt reel and the amount of the belt pulled by the belt retraction part are made to differ from each other.

Furthermore, by driving either the motor or the actuator alone, either belt winding by the belt reel or belt pulling by the belt retraction part can be performed alone. As a result, the restraining force on the shoulder by the belt and the restraining force on the lap by the belt can be made to differ from each other.

Furthermore, since it is possible for the belt to be wound up by the belt reel alone or for the belt to only be retracted by the belt retraction part, it is possible for the amount of movement of the entire belt (the wound amount and the pulled amount) to be reduced depending on the operating conditions.

Thus, sufficiently taking in the slack in the lap belt in accordance with the traveling conditions of the vehicle makes it possible to increase the ability of the seatbelt device to protect the vehicle occupant, and also to maintain a comfortable ride for the vehicle occupant.

Preferably, the seatbelt device further comprises a turning direction detector for detecting a turning direction of the vehicle while the controller is designed to select and implement one of the motor drive control mode and the actuator drive control mode in accordance with the turning direction detected by the turning direction detector.

Thus, either the motor alone is driven or the actuator alone is driven in accordance with the turning direction of the vehicle as detected by the turning direction detector. Particularly, in the case of a so-called three-point support seatbelt device in which the belt is supported by three anchors, the effects of restraining the vehicle occupant by the belt differ depending on the turning direction of the vehicle. Consequently, the winding of the belt by the belt reel and the retracting of the belt by the belt retraction part are selectively switched according to the turning direction. Therefore, it is possible to effectively suppress changes in the posture of the vehicle occupant that accompany vehicle turning.

Preferably, the controller controls the actuator to be switched from a driven state to a stopped state in accordance with a change in the traveling state of the vehicle and controls the motor so that a rotational speed increases when the motor is drive-controlled corresponding to the traveling state of the vehicle after the state switching.

The controller switchably controls the actuator from a retractably driven state to a stopped state in correspondence with changes in the traveling state of the vehicle. Furthermore, there may be cases in which the controller drivably controls the actuator so as to return the belt retraction part to its original position (starting point) after the belt retraction part has momentarily performed the retracting action, in correspondence with further changes in the traveling state of the vehicle. In this case, the belt may slacken toward the belt reel. Therefore, the controller controls the rotational speed of the motor so as to increase in cases in which the belt-winding driving of the motor is controlled corresponding to the latter traveling state. The belt is quickly wound up further by the belt reel. Consequently, any slackening in the belt toward the belt reel can be quickly eliminated.

Desirably, the seatbelt device further comprises a lock mechanism for establishing a locked state so that the belt reel is prevented from rotating in a belt-pulling direction when the vehicle accelerates at a rate exceeding a predetermined lock reference acceleration rate while the controller, as the lock mechanism is in the locked state, drive-controls only the actuator in a belt-slackening direction when a decision has been made that the locked state must be released in accordance with a change in the traveling state.

In cases in which an acceleration rate exceeding the predetermined lock reference acceleration rate occurs in the vehicle, the lock mechanism locks the belt reel so that it will not rotate in the belt-pulling direction. In cases in which the belt reel must be unlocked in accordance with a change in the traveling state of the vehicle while the lock mechanism is implementing the locked state, the actuator alone is driven in the direction of belt slackening. Therefore, the constriction on, e.g., the lap of the vehicle occupant is slackened. The vehicle occupant will have little trouble moving following a period of pronounced acceleration.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
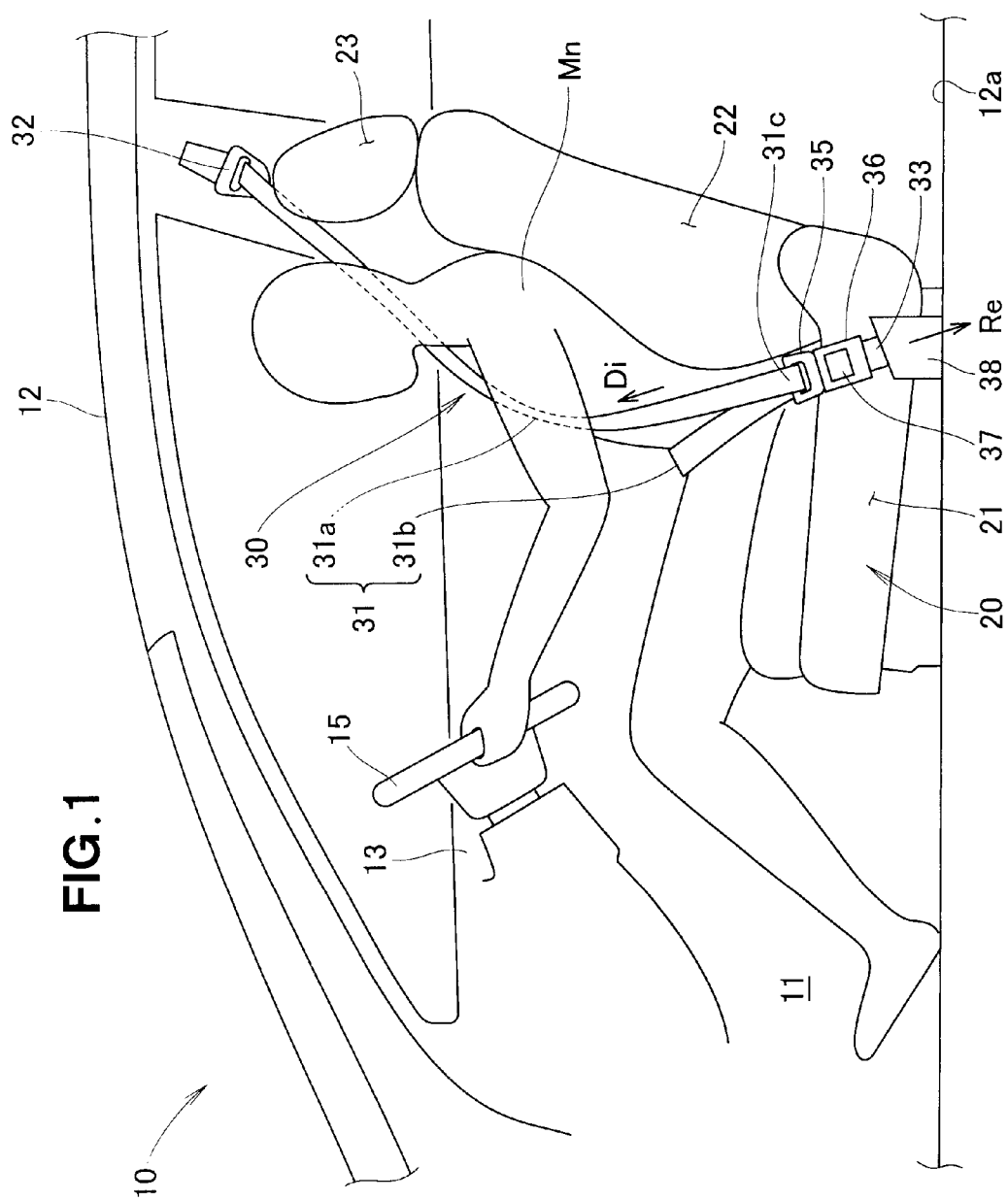
FIG. 1 is a side elevational view showing a vehicle employing a seatbelt device according to the present invention.
Figure 2:
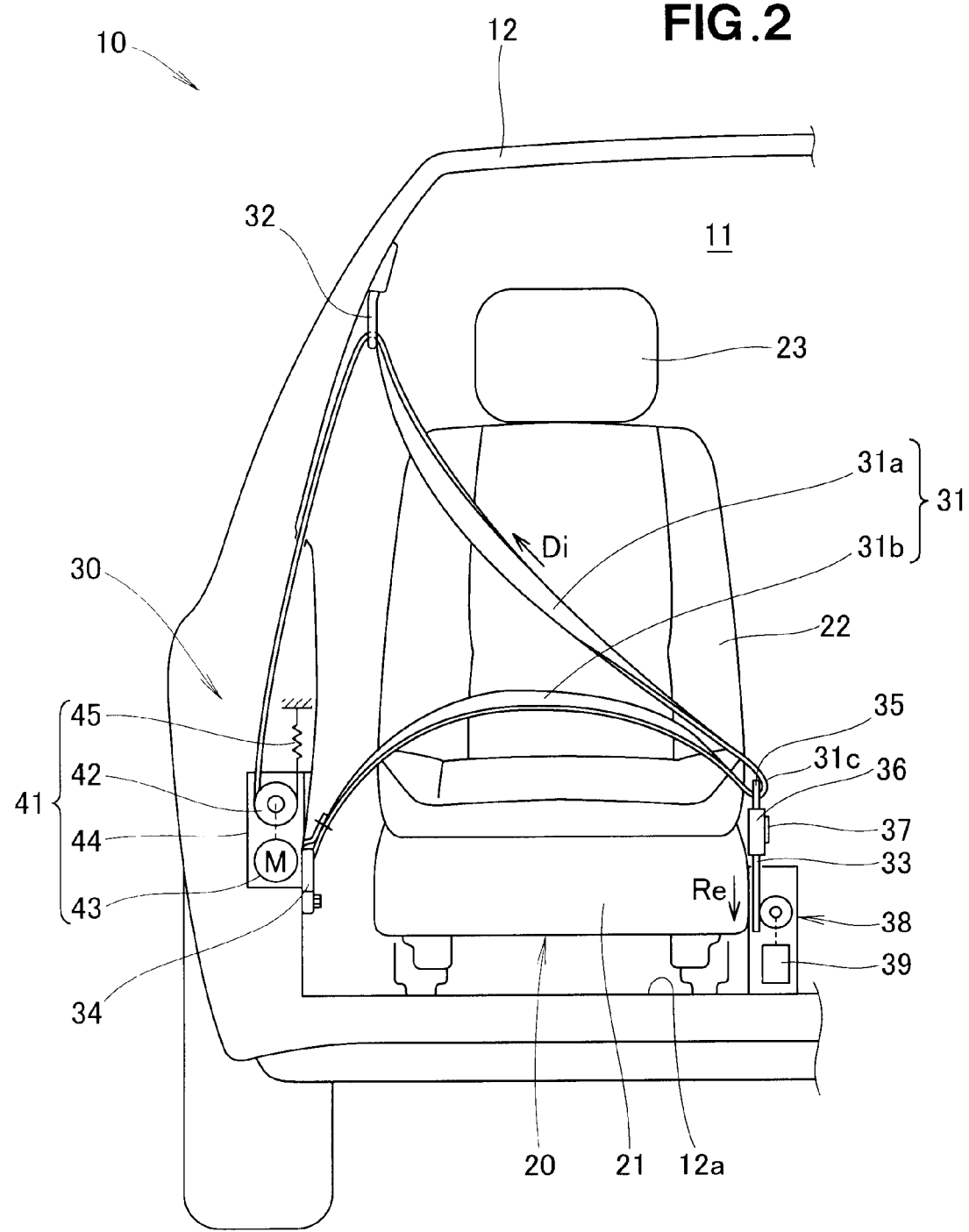
FIG. 2 is a front elevational view showing the vehicle and the seatbelt device of FIG. 1.

Reference is now made to FIG. 1 showing a seat 20 and a seatbelt device 30 provided in a vehicle 10 as seen from sideways, as well as to FIG. 2 showing the seat 20 and the seatbelt device 30 installed in a passenger compartment 11, as seen from the front. The seat 20 shown in FIGS. 1 and 2 is presented as an example of a driver seat in which a driver Mn (vehicle occupant Mn) sits. The seatbelt device 30 is presented as an example of a device for the driver Mn.

The seat 20 is comprised of a seat cushion 21, a seat back 22, and a headrest 23.

The seatbelt device 30 restrains the vehicle occupant Mn sitting in the seat 20 with a belt 31 (also referred to as a seat belt or webbing) and comprises a retractor 41 (belt winder 41). In this seatbelt device 30, the belt 31, which simultaneously restrains the lap and one shoulder of the vehicle occupant Mn, can be wound up by the retractor 41.

The seatbelt device 30 has a three-point support configuration in which the belt 31 is supported by three anchors, which are an upper anchor 32, a center anchor 33, and a lower anchor 34. The upper anchor 32 is provided at the top in the side of a vehicle body 12. The center anchor 33 is provided in the bottom part of the seat 20 in the side opposite the upper anchor 32. The lower anchor 34 is provided in the bottom part on the same side as the upper anchor 32.

The belt 31 is comprised of a shoulder belt 31a for restraining one shoulder of the vehicle occupant Mn, and a lap belt 31b for restraining the lap of the vehicle occupant Mn. In a space 31c (a reversing part 31c of the belt 31) between the shoulder belt 31a and the lap belt 31b, a tongue 35 is provided in a manner that allows the belt 31 to be inserted through and moved. The tongue 35 is attached in a one-touch removable manner to a buckle 36 fixed to the center anchor 33.

A buckle switch 37 is installed in the buckle 36. The buckle switch 37 is switched off when the tongue 35 is attached to the buckle 36, and is reversed from the off state to an on state when the tongue 35 is released from the buckle 36. In other words, the buckle switch 37 generates an off signal when the belt 31 is in an attached state, and generates an on signal when the belt 31 is in an unattached state (separated state). This type of buckle switch 37 is equivalent to a belt attached state detector for detecting the attached state of the belt 31.

The center anchor 33 is linked to a belt retraction part 38, as shown in FIG. 2. The belt retraction part 38, being mounted on the vehicle body 12, is a device which performs an operation to retract the center anchor 33 towards a floor 12a of the vehicle body 12 and also a return operation so as to return the center anchor to its original position. The belt retraction part 38 is also driven by an actuator 39. This type of belt retraction part 38 is configured using, e.g., a rack-and-pinion mechanism, wherein a pinion is rotatably driven by the actuator 39, and the center anchor 33 linked to a rack is thereby slid in the vertical direction of the vehicle body. The actuator 39 is comprised of, e.g., an electric motor.

The following is a description of the action of the belt retraction part 38 in a state in which the tongue 35 is attached to the buckle 36.

The actuator 39 retractably drives the belt retraction part 38, whereby the belt retraction part 38 pulls the center anchor 33 toward the floor 12a (in the direction of the arrow Re). Therefore, the tongue 35 and a part 31c (reversing part 31c) of the belt 31 are pulled toward the floor 12a. As a result, the shoulder belt 31a and the lap belt 31b are pulled toward the floor 12a. In this manner, the slack between the lap belt 31b and the lap of the vehicle occupant Mn (see FIG. 1) can be eliminated. The actuator 39 then stops, whereby the belt retraction part 38 remains in a stopped state. As a result, the shoulder belt 31a and the lap belt 31b remain in a retracted state.

The actuator 39 then returnably drives the belt retraction part 38, whereby the belt retraction part 38 returns the center anchor 33 in the opposite direction of the floor 12a (in the opposite direction of the arrow Re). Therefore, the tongue 35 and the reversing part 31c return to their original positions. As a result, the shoulder belt 31a and the lap belt 31b are slackened. Thus, slack can be created between the lap belt 31b and the lap of the vehicle occupant Mn. The actuator 39 then stops, whereby the belt retraction part 38 remains in a stopped state in its original position. As a result, the shoulder belt 31a and the lap belt 31b remain in a slackened state.

As is made clear from the above description, the belt retraction part 38 pulls a part 31c (reversing part 31c) of the belt 31 in the direction Re opposite the direction Di in which the belt 31 is wound by a belt reel 42 so as to restrain the vehicle occupant Mn.

The retractor 41 is comprised of the belt reel 42 for winding up the belt 31, and a reel-driving electric motor 43 (hereinafter referred to simply as "motor 43") for rotatably driving the belt reel 42, as shown in FIG. 2. In other words, the retractor 41 has a so-called electric pre-tensioner, which is a mechanism for quickly winding the slackened part of the belt 31 by rotatably driving the belt reel 42 by the motor 43 in accordance with the driven state of the vehicle 10 (including times when the vehicle 10 is in a state of emergency).

The belt reel 42 is rotatably housed within a housing 44, and is coupled with one end of the shoulder belt 31a. Furthermore, this belt reel 42 is urged by a return spring 45 in a direction of winding the shoulder belt 31a. Therefore, the belt reel 42 is capable of winding the belt 31. In a usual state, the belt 31 is pulled out from the belt reel 42 against the urging force of the return spring 45.

Figure 3:
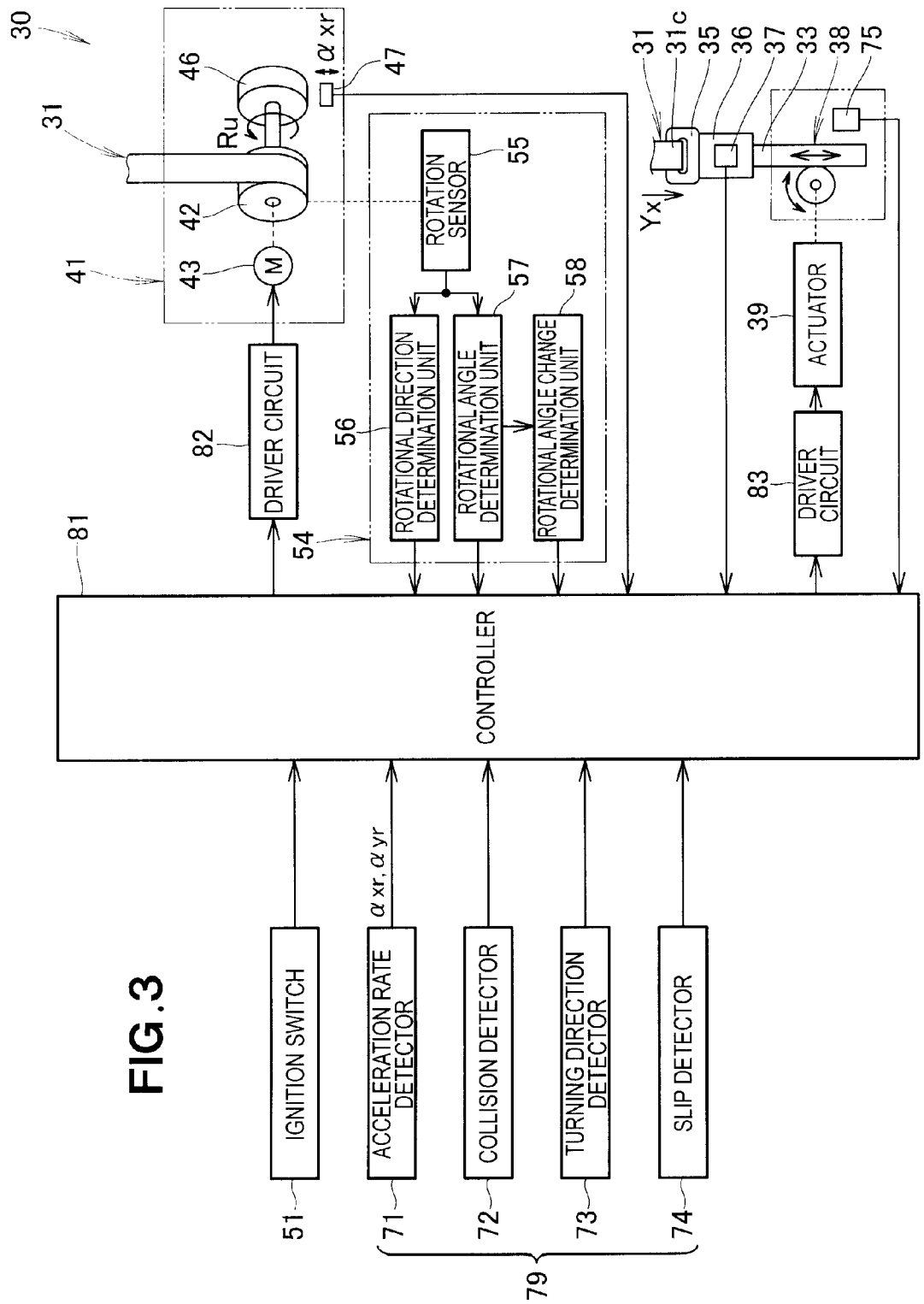
FIG. 3 is a block diagram showing a control circuit for the seatbelt device of FIG. 1.

The retractor 41 comprises a lock mechanism 46 and a lock detector 47, as shown in FIG. 3. The lock mechanism 46 locks and unlocks the rotation of the belt reel 42 in accordance with the acceleration rate. The actual acceleration rate created in the vehicle 10 shown in FIG. 1 in the longitudinal direction (in the direction in which vehicle travels) is denoted as αxr, and a lock reference acceleration rate in the longitudinal direction is denoted as αxs (not shown). The lock reference acceleration rate αxs in the longitudinal direction is a specified reference value set in advance.

The lock mechanism 46 allows the belt reel 42 to rotate in the usual state, and locks it so as to prevent it from rotating in the belt-pulling direction (the direction of the arrow Ru) when an acceleration rate αxr exceeding the lock reference acceleration rate αxs occurs in the vehicle 10.

This type of lock mechanism 46 has a known configuration, e.g., one comprised of a ratchet wheel capable of rotating with the belt reel 42, a ratchet pawl capable of meshing with the ratchet wheel, and an acceleration rate sensor which causes the ratchet pawl to mesh with the ratchet wheel when an acceleration rate αxr exceeding the lock reference acceleration rate αxs is created.

The lock detector 47 detects when the lock mechanism 46 is in a locked state and generates a lock detection signal.

The control circuit of the seatbelt device 30 is configured from (1) a drive means group comprised of the actuator 39 and the motor 43; (2) a detection means group comprised of the buckle switch 37, an ignition switch 51, the lock detector 47, a belt winding position detector 54, an acceleration rate detector 71, a collision detector 72, a steering amount detector 73, a slip detector 74, and a belt retraction amount detector 75; and (3) a control means group comprised of a controller 81, a motor driver circuit 82, and an actuator driver circuit 83, as shown in FIG. 3.

The acceleration rate detector 71, the collision detector 72, the steering amount detector 73, and the slip detector 74 detect the traveling state of the vehicle 10, and these detectors are therefore one type of traveling state detector. When these detectors 71 to 74 are hereinafter referred to collectively, they will be alternatively referred to appropriately as a "traveling state detector 79 for detecting the traveling state of the vehicle 10."

The ignition switch 51 is a known main switch for starting up a drive source for traveling (engine or motor) (not shown).

The belt winding position detector 54 detects the position to which the belt 31 has been wound by the belt reel 42. This belt winding position detector 54 is comprised of a rotation sensor 55, a rotational direction determination unit 56, a rotational angle determination unit 57, and a rotational angle change determination unit 58.

The rotation sensor 55 is configured from a known magnetic sensor which detects the rotation of the belt reel 42 and which is comprised of a combination of a magnetic disk linked to a shaft of the belt reel 42, and two Hall ICs disposed in the periphery of the magnetic disk, for example. The magnetic disk rotates in conjunction with the belt reel 42. Pulse signals generated from the two Hall ICs have a predetermined mutual phase difference. Therefore, the rotational direction of the belt reel 42 can be detected based on the pulse signals.

The rotational direction determination unit 56 determines the rotational direction of the belt reel 42 and generates a rotational direction signal on the basis of the pulse signals generated by the rotation sensor 55. The combined structure of the rotation sensor 55 and the rotational direction determination unit 56 constitutes a rotational direction detector.

The rotational angle determination unit 57 determines the rotational angle of the belt reel 42 and generates a rotational angle signal (rotation position sensor) on the basis of the pulse signals generated by the rotation sensor 55. The combined structure of the rotation sensor 55 and the rotational angle determination unit 57 constitutes a rotational angle detector.

The rotation angle change determination unit 58 determines changes in the rotational angle of the belt reel 42 by determining the state of change in the rotational angle signal generated by the rotational angle determination unit 57, and generates a signal according to this rotational angle change, i.e., a rotational angle change signal (rotational speed signal). It is possible to obtain a signal according to the rotational speed of the belt reel 42 by finding the change in the rotational angle per unit time. The combined structure of the rotation sensor 55, the rotational angle determination unit 57, and the rotation angle change determination unit 58 constitutes a rotational angle change detector.

The signals outputted from the rotational direction determination unit 56, the rotational angle determination unit 57, and the rotation angle change determination unit 58 are used as detection information on the wound position and wound amount of the belt 31 by the belt reel 42.

The acceleration rate detector 71 detects the acceleration rate αxr created in the vehicle 10 in the longitudinal direction and an acceleration rate αyr in the transverse direction (in the width direction of the vehicle).

The collision detector 72 is for predicting the possibility of the vehicle 10 colliding with another object, and is comprised of a combined configuration including a vehicle speed sensor and radar. This type of collision detector 72 generates a collision prediction signal upon predicting the possibility of a collision.

The steering amount detector 73 detects the steered amount, i.e., the steered angle (including the steered direction) of a steering wheel 15 shown in FIG. 1. This type of steering amount detector 73 is a type of turning direction detector. The steering amount detector 73 is hereinafter appropriately referred to as the "turning direction detector 73."

The slip detector 74 detects the occurrence of a slip phenomenon in which the vehicle 10 moves in the transverse direction (vehicle width direction) while the vehicle 10 is at least turning, and detects this primarily on the basis of the yaw rate (yaw angle speed) and the yaw rate deviation, for example. This type of slip detector 74 generates a slip occurrence signal upon detecting that the slip phenomenon has occurred in the vehicle 10 in the transverse direction.

The belt retraction amount detector 75 detects the amount Yx in which the belt 31 is retracted by the belt retraction part 38. The pulled amount Yx is detected by measuring the amount by which the center anchor 33 moves.

The controller 81 is comprised of, e.g., a microcomputer, which controls the motor 43 via the motor driver circuit 82 on the basis of signals received from the detection means 37, 47, 51, 54, and 71 to 75, and also controls the actuator 39 via the actuator driver circuit 83.

The motor driver circuit 82 is a motor drive controller for controlling the driving electric current supplied to the motor 43, in accordance with a control signal of the controller 81.

The actuator driver circuit 83 is an actuator drive controller for controlling the driving electric current supplied to the actuator 39, in accordance with a control signal of the controller 81.

Next, the control flow of the controller 81 will be described based on FIGS. 4 through 10, with reference to FIGS. 1 through 3.

Figure 4:
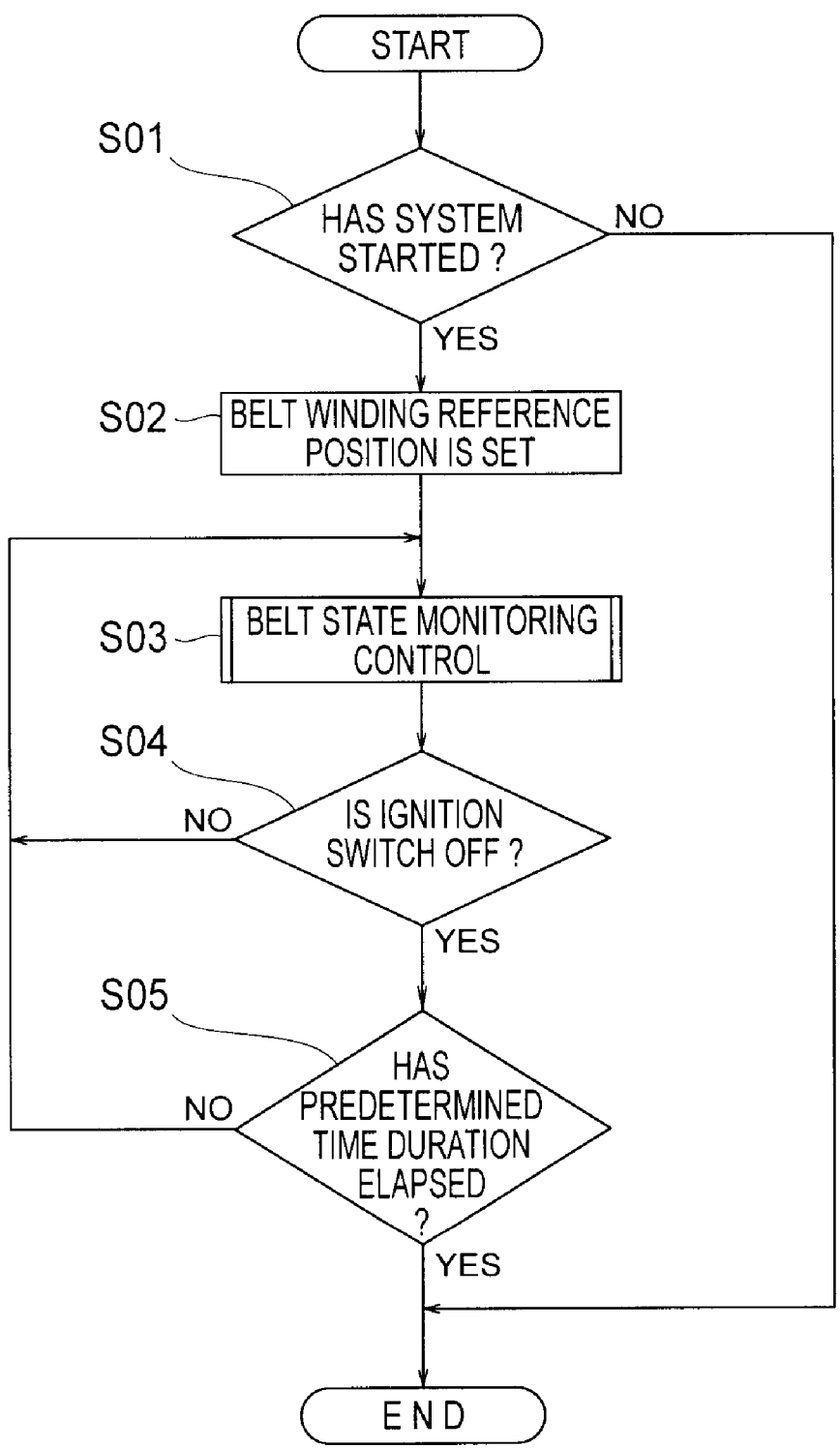
FIG. 4 is a flowchart showing an example of belt housing control implemented by the controller of FIG. 3.

FIG. 4 shows a control flowchart (main routine) showing an example of belt housing control implemented by the controller 81. The controller 81 first determines whether or not the belt housing control system has started up (step S01). This decision is based on a signal of the ignition switch 51, for example. When the ignition switch 51 is off, the belt housing control system is in a "sleep state" in which it does not start up.

Upon then receiving an on signal from the ignition switch 51, the controller 81 determines in step S01 that the belt housing control system has started up (i.e., the controller 81 has started up), and the process advances to the next step S02. Initial settings are implemented in step S02. In other words, a belt wound reference position is set.

Next, belt state monitoring control is implemented in step S03. This control is implemented by the subroutine shown in FIG. 5.

Next, in step S04, a decision is made as to whether or not the ignition switch 51 is off. The belt state monitoring control in step S03 is continued while the ignition switch 51 stays on. When it is then determined that the ignition switch 51 has been switched off, the process advances to the next step S05.

In step S05, a decision is made as to whether or not a specified time duration set in advance has elapsed. In other words, when the ignition switch 51 has been switched off (step S04), the belt state monitoring control in step S03 is continued while the off state continues throughout the specified elapsed time duration (step S05), and the belt state monitoring control in step S03 is ended after the specified time duration has elapsed. The belt housing control system then goes into a sleep state. Thus, step S03 is constantly being implemented while the ignition switch 51 stays on.

However, when the ignition switch 51 is switched back on immediately after being switched off when the elapsed time duration has not been set, the belt housing control system will stop and repeat startup in a short amount of time. This is annoying to the vehicle occupant Mn. To avoid annoying the vehicle occupant, the elapsed time duration is set in step S05.

Figure 5:
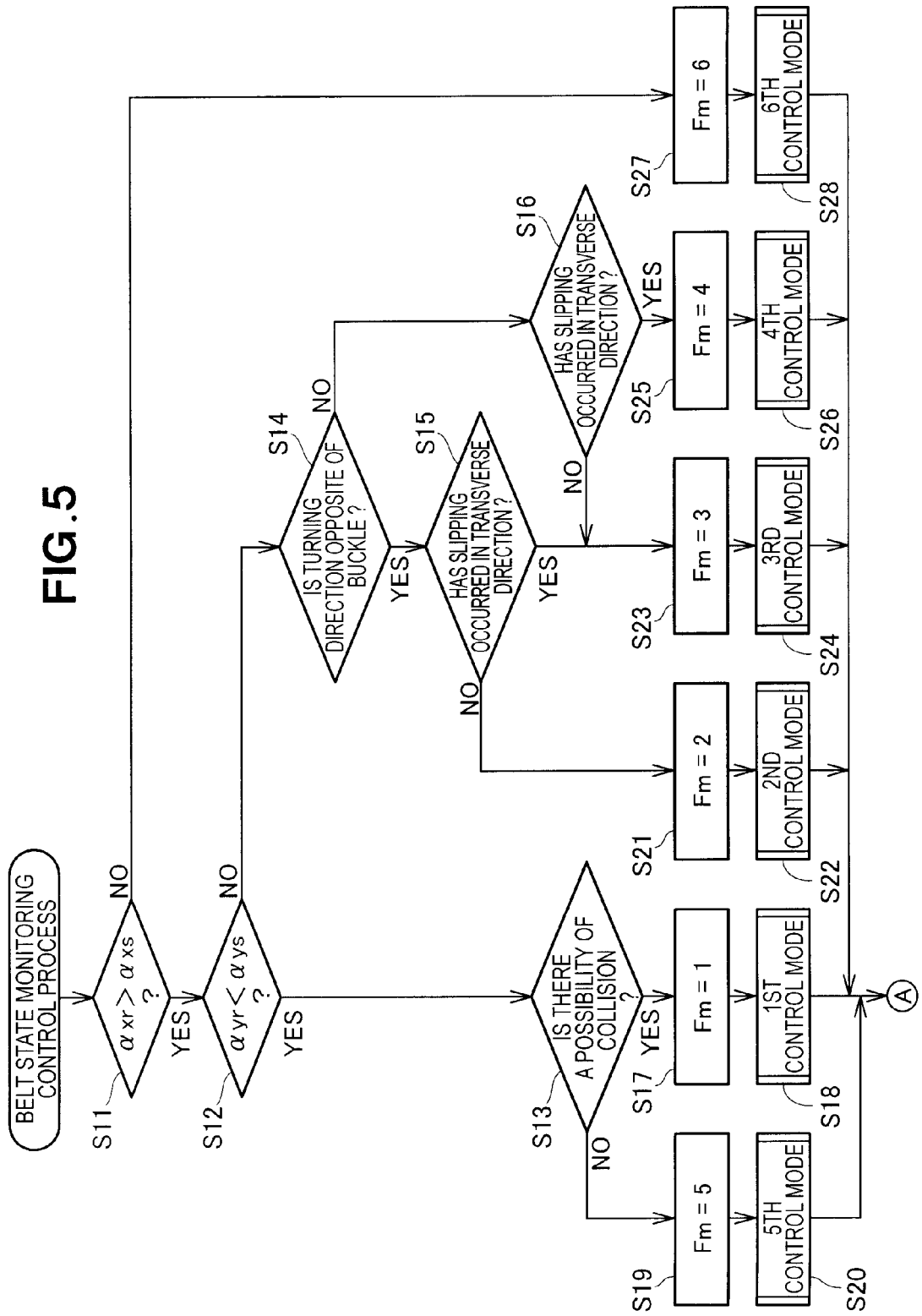
FIG. 5 is a flowchart of a subroutine for implementing the process of the belt state monitoring control shown in FIG. 4.

FIG. 5 shows a subroutine for implementing step S03, i.e., the belt state monitoring control shown in FIG. 4. The tongue 35 becomes attached to the buckle 36. In the subroutine shown in FIG. 5, steps S11 to S16 are first implemented, and according to the result, one step is selected and implemented from among six steps S18, S20, S22, S24, S26, and S28.

In step S11, a decision is made as to whether or not the acceleration rate $\alpha xr$ in the longitudinal direction as detected by the acceleration rate detector 71 is greater than the lock reference acceleration rate $\alpha xs$ in the longitudinal direction ($\alpha xr > \alpha xs$) (a decision is made as to whether or not a first condition is met). The lock reference acceleration rate $\alpha xs$ in the longitudinal direction is set to a value that results from the lock mechanism 46 reversing from the unlocked state to the locked state.

In step S12, a decision is made as to whether or not the acceleration rate $\alpha yr$ in the transverse direction as detected by the acceleration rate detector 71 is less than a reference acceleration rate $\alpha ys$ in the transverse direction ($\alpha yr < \alpha ys$) (a decision is made as to whether or not a second condition is met).

In step S13, a decision is made as to whether or not there is a possibility of the vehicle 10 colliding with another object, i.e., whether or not the controller 81 has received a collision prediction signal from the collision detector 72 (a decision is made as to whether or not a third condition has been met).

In step S14, a decision is made as to whether or not the turning direction of the vehicle 10 is laterally opposite of the buckle 36 in relation to the seat 20, i.e., in the direction opposite the buckle 36 (a decision is made as to whether or not a fourth condition is met). The turning direction is based on the steering direction detected by the steering amount detector 73.

In step S15, a decision is made as to whether or not a "slip phenomenon" has occurred in which the turning vehicle 10 moves in the transverse direction, i.e., whether or not the controller 81 has received a slip occurrence signal from the slip detector 74 (a decision is made as to whether or not a fifth condition is met).

Step S16 is a step in which the same determination is made as in step S15 (a decision is made as to whether or not a sixth condition is met).

In cases in which it is determined in step S11 that the acceleration rate $\alpha xr$ in the longitudinal direction is greater than the lock reference acceleration rate $\alpha xs$ ($\alpha xr > \alpha xs$), it is determined in step S12 that the acceleration rate $\alpha yr$ in the transverse direction is less than the reference acceleration rate $\alpha ys$ in the transverse direction ($\alpha yr < \alpha ys$), and it is determined in step S13 that there is a possibility of the vehicle 10 colliding with another object; a control mode flag Fm is set to "1" in step S17, and a first control mode is implemented in step S18.

In cases in which it is determined in step S13 that there is no possibility of the vehicle 10 colliding with another object, the control mode flag Fm is set to "5" in step S19, and a fifth control mode is implemented in step S20.

In cases in which it is determined in step S11 that the acceleration rate $\alpha xr$ in the longitudinal direction is greater than the lock reference acceleration rate $\alpha xs$ ($\alpha xr > \alpha xs$), it is determined in step S12 that the acceleration rate $\alpha yr$ in the transverse direction is equal to or greater than the reference acceleration rate $\alpha ys$ in the transverse direction ($\alpha yr \geq \alpha ys$), it is determined in step S14 that the turning direction of the vehicle 10 is opposite the side of the buckle 36, and it is determined in step S15 that the turning vehicle 10 is not slipping in the transverse direction; the control mode flag Fm is set to "2" in step S21, and a second control mode is implemented in step S22.

In cases in which it is determined in step S15 that the turning vehicle 10 has slipped in the transverse direction, the control mode flag Fm is set to "3" in step S23, and a third control mode is implemented in step S24.

In cases in which it is determined in step S11 that the acceleration rate $\alpha xr$ in the longitudinal direction is greater than the lock reference acceleration rate $\alpha xs$ ($\alpha xr > \alpha xs$), in step S12 that the acceleration rate $\alpha yr$ in the transverse direction is equal to or greater than the reference acceleration rate αys in the transverse direction (αyr≧αys), in step S14 that the turning direction of the vehicle 10 is the same as the side of the buckle 36, and in step S16 that the turning vehicle 10 has not slipped in the longitudinal direction, the control mode flag Fm is set to "3" in step S23, and a third control mode is implemented in step S24.

In cases in which it is determined in step S16 that the turning vehicle 10 has slipped in the transverse direction, the control mode flag Fm is set to "4" in step S25, and a fourth control mode is implemented in step S26.

In cases in which it is determined in step S11 that the acceleration rate αxr in the longitudinal direction is equal to or less than the lock reference acceleration rate αxs (αxr≦αxs), the control mode flag Fm is set to "6" in step S27, and a sixth control mode is implemented in step S28.

An outline of the control modes is shown in the following Table 1.

TABLE 1

| Control mode | Motor control | Actuator control | Belt action |
|---|---|---|---|
| First control mode | Shoulder belt windably driven | Lap belt retractably driven | Occupant quickly restrained by entire belt Slack in entire belt quickly taken out |
| Second control mode | Shoulder belt driven so as to be held | Lap belt retractably driven | Entire belt secured to occupant |
| Third control mode | Stopped | Lap belt retractably driven | Slack in lap belt taken out |
| Fourth control mode | Shoulder belt windably driven | Stopped | Occupant's upper body returned to seat back by shoulder belt |
| Fifth control mode | Shoulder belt driven so as to be held | Stopped | Occupant's upper body held by shoulder belt |
| Sixth control mode | Stopped | Stopped | Usual state of no belt action |

In other words, in the first control mode, the motor 43 is drivably controlled so that the shoulder belt 31a is wound up by the belt reel 42. At the same time, the actuator 39 is drivably controlled so that the lap belt 31b is pulled in the direction of the arrow Re (the reversing part 31c is retracted) by the belt retraction part 38. As a result, the slack in the entire belt 31 can be quickly taken out, and the vehicle occupant Mn can be quickly restrained by the entire belt 31.

In the second control mode, the motor 43 is drivably controlled so that the shoulder belt 31a is prevented from being pulled out of the belt reel 42 and is held in place. At the same time, the actuator 39 is drivably controlled so that the lap belt 31b is pulled in the direction of the arrow Re by the belt retraction part 38. As a result, the entire belt 31 can be secured against the vehicle occupant Mn.

In the third control mode, the motor 43 is stoppably controlled. At the same time, the actuator 39 is drivably controlled so that the lap belt 31b is pulled in the direction of the arrow Re by the belt retraction part 38. As a result, the slack in the lap belt 31b can be taken out.

In the fourth control mode, the motor 43 is drivably controlled so that the shoulder belt 31a is wound up by the belt reel 42. At the same time, the actuator 39 is stoppably controlled. In this case, the amount by which the shoulder belt 31a is wound is comparatively large. As a result, the upper body of the vehicle occupant Mn (upper half of the body) can be pulled against the seat back 22 by the shoulder belt 31a.

In the fifth control mode, the motor 43 is drivably controlled so that the shoulder belt 31a is prevented from being pulled out from the belt reel 42 and is held in place. At the same time, the actuator 39 is stoppably controlled. As a result, the upper body of the vehicle occupant Mn can be held by the shoulder belt 31a.

In the sixth control mode, the motor 43 and the actuator 39 are stoppably controlled. As a result, a usual state is in effect in which there is no belt 31 action.

Figure 6:
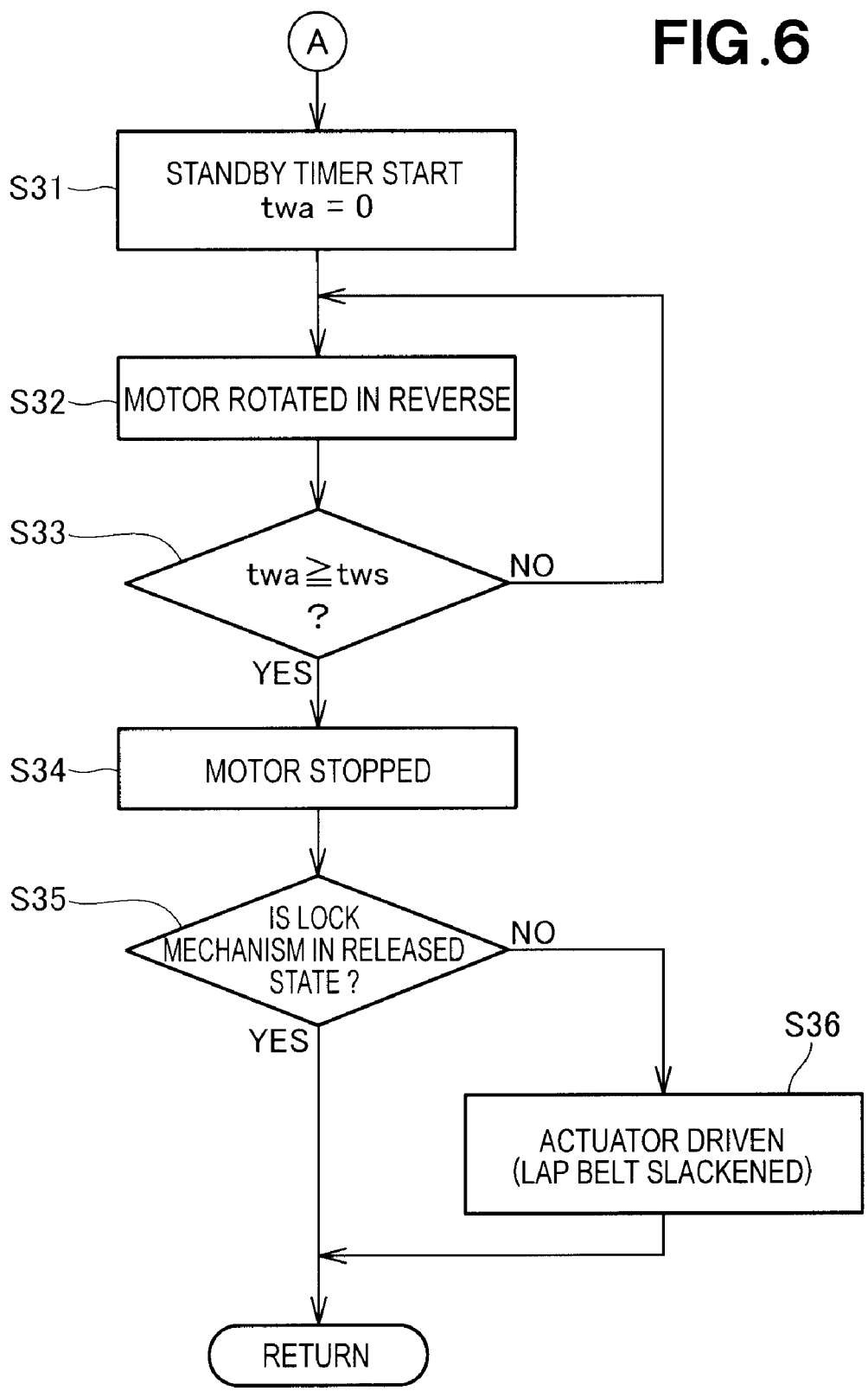
FIG. 6 is a flowchart of a lock mechanism release control implemented following the belt state monitoring control process shown in FIG. 5.

After one step has been selected and implemented from among the six steps S18, S20, S22, S24, S26, and S28, steps S31 through S34 shown in FIG. 6 are implemented.

First, in step S31, a startup standby time twa of a startup standby timer is set to "0," whereupon the startup standby timer is started. Next, the motor 43 is rotatably controlled in a direction of belt retraction, i.e., the motor is rotated in reverse (step S32). The drive force of the motor 43 is transmitted to the belt reel 42 via a clutch mechanism (not shown). The clutch mechanism is herein disengaged (deactivated) by the motor 43 rotating in the direction of the belt being pulled out. The clutch mechanism is thereafter returned to an engaged state (activated) by the motor 43 rotating in the direction of winding in the belt.

Step S32 is repeated continually until the startup standby time twa reaches a reference standby time tws (step S33). The reference standby time tws is set in advance to a time required for the clutch mechanism to be reliably disengaged. The motor 43 is then stopped (step S34).

Next, a decision is made, based on a detection signal of the lock detector 47, as to whether or not the lock mechanism 46 is in the released state (step S35). This step S35 constitutes a "lock operation determination part" for determining whether or not the lock mechanism 46 is operating. To be more specific, in cases in which the acceleration rate αxr in the longitudinal direction is greater than the lock reference acceleration rate αxs as described above (αxr>αxs), the lock mechanism 46 is switched from the released state to the locked state. The lock detector 47 detects that the locked state has taken effect. Having received a lock detection signal from the lock detector 47, step S35 determines that the lock mechanism 46 is in a locked state.

In cases in which it is determined in step S35 that the lock mechanism 46 is in a released state, the subroutine shown in FIGS. 5 and 6 is ended, and the process returns to step S03 of the main routine shown in FIG. 4. In cases in which it is determined in step S35 that the lock mechanism 46 is in a locked state, the actuator 39 is drivably controlled so that the lap belt 31b is slackened by the belt retraction part 38 (step S36). As a result, the lap belt 31b can be slackened. The subroutine shown in FIGS. 5 and 6 is then ended, and the process returns to step S03 of the main routine shown in FIG. 4.

A summary of the description of steps S35 to S36 is as follows.

The lock mechanism 46 has a configuration whereby the lock is released by the belt reel 42 rotating slightly in the belt-winding direction when the lock mechanism 46 is in a locked state. Even if the lock mechanism 46 is in a locked state, the belt reel 42 is permitted to rotate in the belt-winding direction. Moreover, the belt reel 42 is urged in the belt-winding direction by the return spring 45. Therefore, during the locked state of the lock mechanism 46 (step S35), when the lap belt 31b is slackened by the belt retraction part 38 (step S36), the belt reel 42 rotates in the direction of winding up the belt 31 in proportion to the amount by which the lap belt 31b has slackened. As a result, the lock mechanism 46 is released from the locked state. The vehicle occupant Mn can thereafter freely pull the belt 31 out from the belt reel 42.

Before steps S35 to S36 are implemented, the clutch mechanism is released by steps S31 to S34. Therefore, when the belt reel 42 rotates in the direction of winding up the belt 31, the stopped motor 43 does not rotate.

Slightly rotating the belt reel 42 in the belt-winding direction using the motor 43 is a possible option for releasing the lock of the lock mechanism 46. However, when the lock mechanism 46 is in the locked state, the vehicle occupant Mn is strongly restrained by the belt 31. The restraining force applied by the belt 31 increases nevertheless because the motor 43 is driven to wind the belt 31 further. This is inadvisable because the vehicle occupant Mn has a greater sense of being restrained.

To deal with this issue, the belt 31 is wound up by the belt reel 42 in proportion to the amount by which the lap belt 31*b* is slackened. Therefore, the vehicle occupant Mn does not have a greater sense of being restrained.

Figure 7:
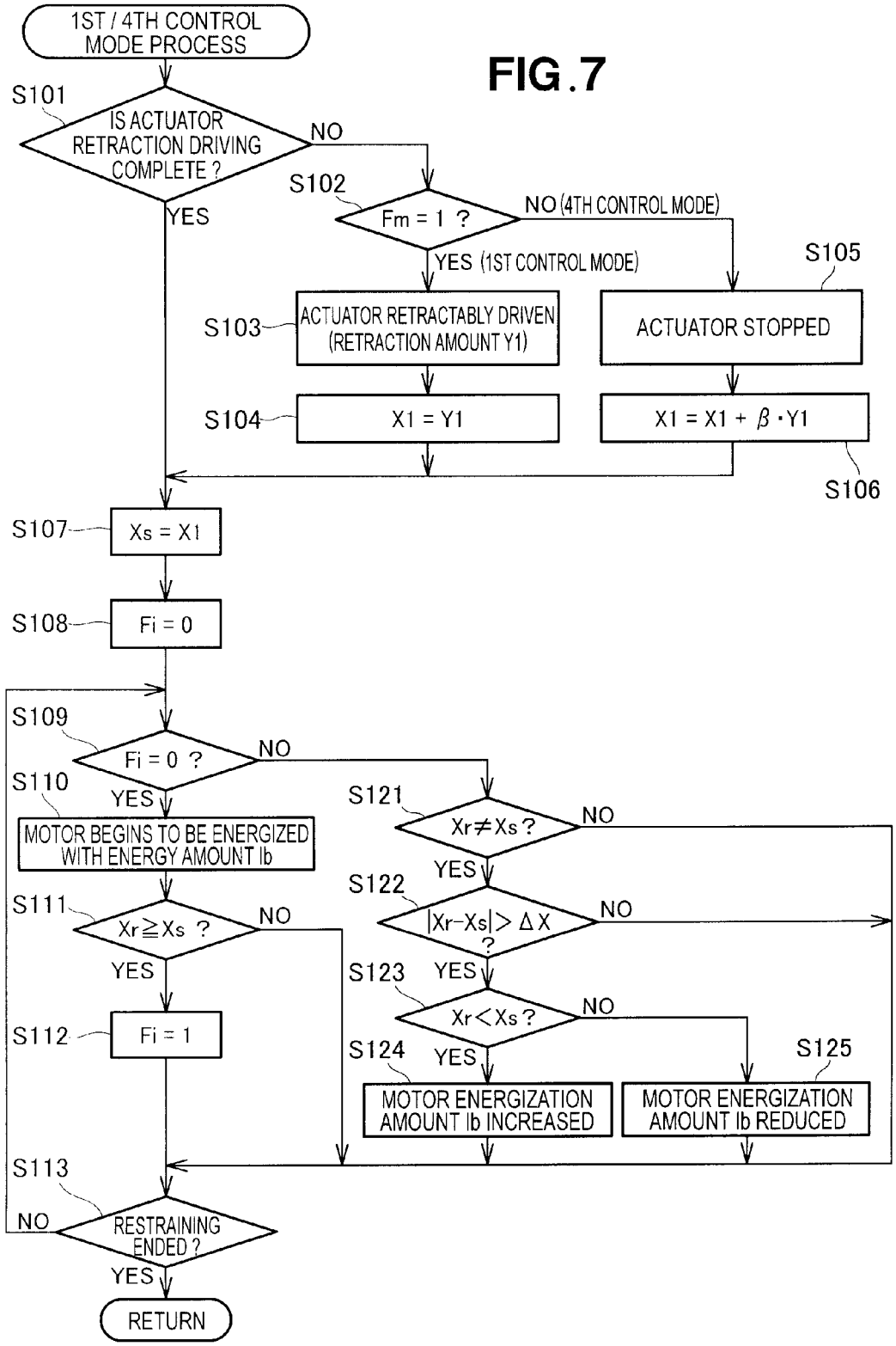
FIG. 7 is a flowchart of the processes for implementing the first and fourth control modes shown in FIG. 5.

FIG. 7 shows a subroutine for implementing step S18 (first control mode) or step S26 (fourth control mode) shown in FIG. 5. This subroutine has substantially the same control specifics in both the first control mode and the fourth control mode. They are different in that steps S103 and S104 are implemented in the first control mode, while steps S105 and S106 are implemented in the fourth control mode. The switch depends on the determination in step S102.

The following is a detailed description. In step S101 in the subroutine shown in FIG. 7, a decision is made as to whether or not the retraction driving of the actuator 39 is complete. In the initial stage, the retraction driving is not complete, and steps S102 to S106 are therefore implemented.

First, a decision is made in step S102 as to whether or not the control mode flag Fm is 1. When it is determined in step S102 that "Fm=1," the first control mode is selected from the first and fourth control modes. In this case, the actuator 39 is drivably controlled in step S103 so that the lap belt 31*b* is pulled in the direction of the arrow Re in an amount Y1 by the belt retraction part 38. The retraction amount Y1 is a value automatically set according to the size of the acceleration rates αxr, αyr and the extent of the possibility of a collision, for example. The retraction amount Y1 may also be a specified value set in advance. Next, after the value of the winding amount X1 of the shoulder belt 31*a* has been set in step S104 to the same value as the retraction amount Y1 (X1=Y1), steps S107 to S125 are implemented.

When it is determined in step S102 that "Fm≠1," the fourth control mode is selected from the first and fourth control modes. In this case, the actuator 39 is stoppably controlled in step S105. Next, after the value of the winding amount X1 of the shoulder belt 31*a* has been corrected in step S106, steps S107 to S125 are implemented. In other words, the value of the winding amount X1 is corrected by adding the result of multiplying the retraction amount Y1 by a correction value β to the winding amount X1 (X1=X1+β×Y1).

The correction value β is a variable that is automatically set from a range of 0.0 to 1.0, for example, in accordance with the size of the acceleration rates αxr, αyr and the extent of the possibility of a collision. The correction value β may otherwise be a specified value set in advance. The correction value β may also be a value greater than 1.0. A value of "1−β" may also be used instead of the correction value β.

Since the retraction driving of the actuator 39 thereafter concludes while the subroutine shown in FIG. 7 is repeating, the retraction driving of the actuator 39 is determined to be complete in step S101, under which circumstances steps S107 to S125 are implemented.

Next, in step S107, the value of a reference winding amount Xs is set to the winding amount X1 (Xs=X1). This reference winding amount Xs is a reference for the amount by which the shoulder belt 31*a* is wound by the belt reel 42.

Next, an energy amount variation flag Fi is set to "0" in step S108. Next, a decision is made in step S109 as to whether or not the energy amount variation flag Fi is "0." If it is determined that F1=0, power begins to be supplied to the motor 43 in step S110 in order to perform the belt-winding action. The energy amount (electric current) supplied to the motor 43 at this time is Ib. As a result, the belt reel 42 begins to rotate in the belt-winding direction, and the shoulder belt 31*a* is wound.

Next, in step S111, a decision is made as to whether or not the winding amount Xr of the wound shoulder belt 31*a* has reached the reference winding amount Xs (Xr≧Xs). When it is determined that Xs has been reached, the process advances to step S113 after the energy amount variation flag Fi is reversed to "1" (step S112), and when it is determined that Xs has not been reached, the process advances to step S113.

Next, a decision is made in step S113 as to whether or not the restraining of the vehicle occupant Mn by the belt 31 has ended. It is determined to have ended when the traveling state of the vehicle 10 is stable. In other words, step S113 concludes in cases in which the traveling state corresponding to the first control mode or the fourth control mode has ended. The process returns to step S109 when the control mode is determined to have not ended, and when the control mode is determined to have ended, the subroutine shown in FIG. 7 is ended, and the process returns to step S18 or S26 of the subroutine shown in FIG. 5.

When the energy amount variation flag Fi is reversed from "0" to "1" in step S112, it is determined in step S109 that F1≠0. In this case, steps S121 to S125 are implemented.

In step S121, a decision is made as to whether or not the winding amount Xr is inconsistent with the reference winding amount Xs (Xr≠Xs).

In step S122, a decision is made as to whether or not the absolute value of the difference between the winding amount Xr and the reference winding amount Xs is greater than a reference deviation amount ΔX (|Xr−Xs|>ΔX). The reference deviation amount ΔX is a specified value set in advance.

In step S123, a decision is made as to whether or not the winding amount Xr is less than the reference winding amount Xs (Xr<Xs).

In cases in which it is determined in step S121 that "Xr=Xs," and also in cases in which it is determined in step S122 that "|Xr−Xs|≦ΔX," the process advances to step S113. In cases in which it is determined in step S121 that "Xr≠Xs" and it is determined in step S122 that "|Xr−Xs|>ΔX," the process advances to step S123.

In cases in which it is determined in step S123 that "Xr<Xs," the drive electric current Ib supplied to the motor 43 is increased by a predetermined value (step S124) in order to increase the force with which the belt is wound by the belt reel 42, and the process advances to step S113. In cases in which it is determined in step S123 that "Xr≧Xs," the drive electric current Ib supplied to the motor 43 is reduced by a predetermined value (step S125) in order to reduce the force with which the belt is wound by the belt reel 42, and the process advances to step S113.

In the first control mode and the fourth control mode, the shoulder belt 31*a* is preferably wound up as quickly as possible. Therefore, the speed of the process is increased as much as possible by repeating only steps S109 to S113 until the condition "Xr≧Xs" is achieved in step S111. In other words, the motor 43 is rotatably driven with a specified energization amount Ib, and the shoulder belt 31a is wound up. The process thereafter transitions to step S121 to S125.

Figure 8:
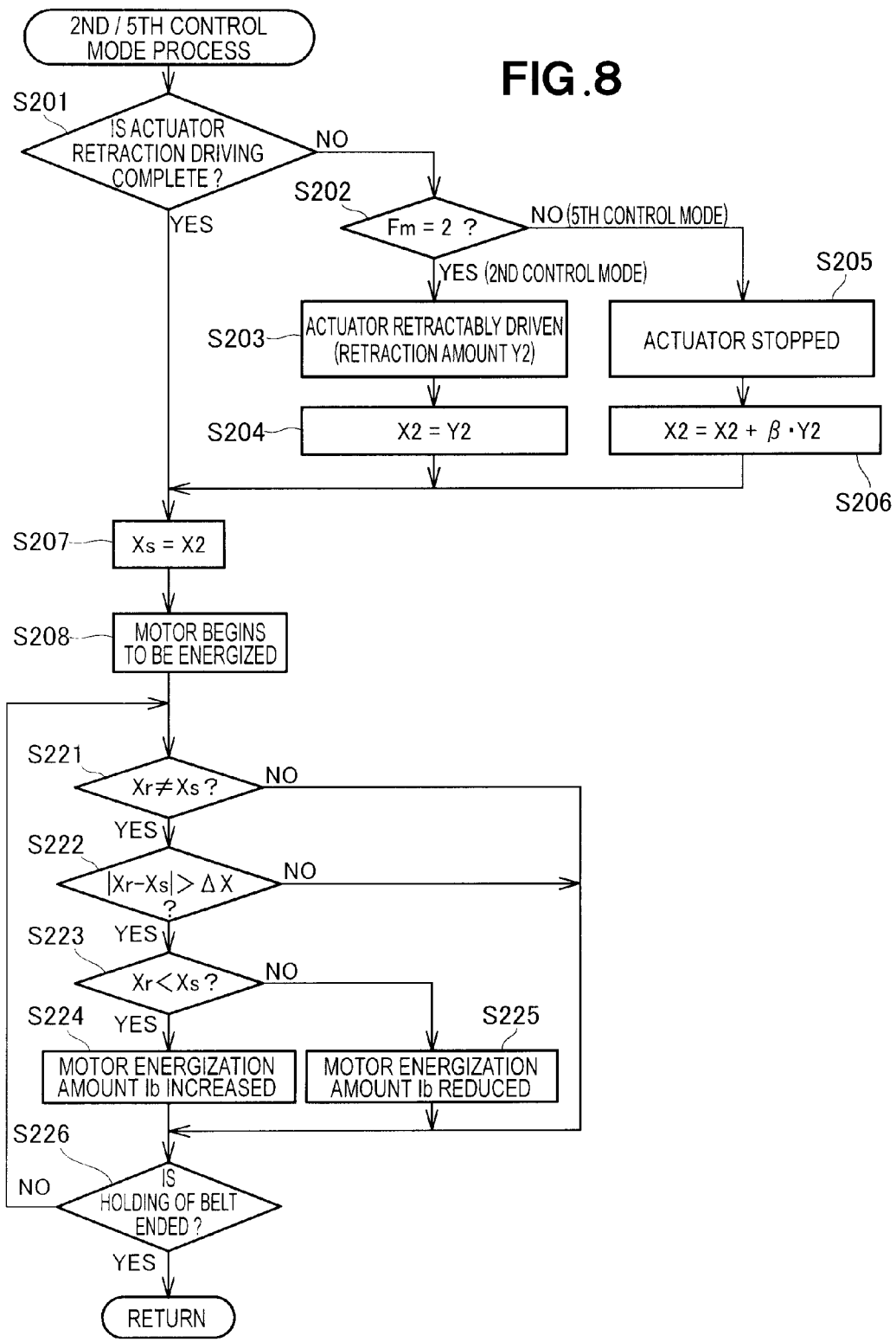
FIG. 8 is a flowchart in of the processes for implementing the second and fifth control modes shown in FIG. 5.

FIG. 8 shows a subroutine for implementing step S22 (second control mode) or step S20 (fifth control mode) shown in FIG. 5. This subroutine has substantially the same control specifics in both the second control mode and the fifth control mode. The difference is that steps S203 and S204 are implemented in the second control mode, while steps S205 and S206 are implemented in the fifth control mode. The switch depends on the determination in step S202.

The following is a detailed description. In step S201 in the subroutine shown in FIG. 8, a decision is made as to whether or not the retraction driving of the actuator 39 is complete. In the initial stage, the retraction driving is not complete, and steps S202 to S206 are therefore implemented.

First, a decision is made in step S202 as to whether or not the control mode flag Fm is 2. When it is determined in step S202 that "Fm=2," the second control mode is selected from the second and fifth control modes. In this case, the actuator 39 is drivably controlled in step S203 so that the lap belt 31b is pulled in the direction of the arrow Re in a retraction amount Y2 by the belt retraction part 38. The retraction amount Y2 is a value automatically set according to the size of the acceleration rates αxr, αyr and the extent of the possibility of a collision, for example. The retraction amount Y2 may also be a specified value set in advance. Next, after the value of the wound amount X2 of the shoulder belt 31a has been set in step S204 to the same value as the retraction amount Y2 (X2=Y2), steps S207 to S226 are implemented.

When it is determined in step S202 that "Fm≠2," the fifth control mode is selected from the second and fifth control modes. In this case, the actuator 39 is stoppably controlled in step S205. Next, after the value of the wound amount X2 of the shoulder belt 31a has been corrected in step S206, steps S207 to S226 are implemented. In other words, the value of the wound amount X2 is corrected by adding the result of multiplying the retraction amount Y2 by a correction value β to the wound amount X2 (X2=X2+β×Y2). The correction value β is the same as the correction value β used in step S106 of FIG. 7, for example.

Since the retraction driving of the actuator 39 is thereafter completed while the subroutine shown in FIG. 8 is repeating, the retraction driving of the actuator 39 is determined to be complete in step S201, under which circumstances steps S207 to S226 are implemented.

Next, in step S207, the value of the reference winding amount Xs is set to the wound amount X2 (Xs=X2). Next, after energization for performing the belt-winding action has been initiated in the motor 43 in step S208, the process advances to step S221. As a result, the belt reel 42 begins to rotate in the belt-winding direction, and the shoulder belt 31a is wound up.

In the subroutine shown in FIG. 8, the implementation specifics (control specifics) of step S221 are substantially the same as the implementation specifics of step S121 shown in FIG. 7. Similarly, the following step pairs are substantially identical: S222 and S122, S223 and S123, S224 and S124, and S225 and S125. Thus, since steps S221 to S225 are essentially identical to the previously described steps S121 to S125 shown in FIG. 7, the description previously given is cited.

After steps S224 or S225 described above have been implemented, a decision is made in step S226 as to whether or not the state of drivably controlling the motor 43 has been ended so as to prevent the shoulder belt 31a from being pulled out from the belt reel 42 and hold the shoulder belt in place. It is determined to have ended when the traveling state of the vehicle 10 is stable or when a transition to another state has been made. In other words, step S226 concludes when the traveling state corresponding to the second control mode or the fifth control mode has ended. The process returns to step S221 if it is determined to have not ended, while if it is determined to have ended, the subroutine shown in FIG. 7 concludes, and the process returns to step S20 or S22 of the subroutine shown in FIG. 5.

Figure 9:
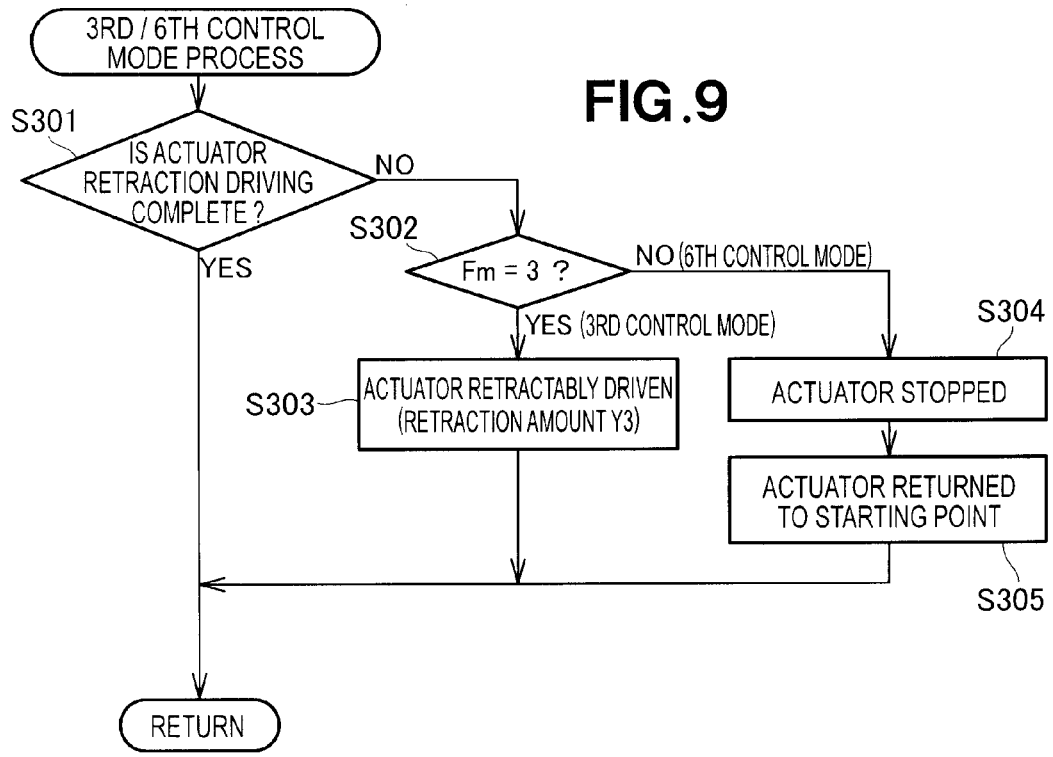
FIG. 9 is a flowchart of the processes for implementing the third and sixth control modes shown in FIG. 5.

FIG. 9 shows a subroutine for implementing step S24 (third control mode) or step S28 (sixth control mode) shown in FIG. 5. This subroutine has substantially the same control specifics as both the third control mode and the sixth control mode. They are mutually different in that step S303 is implemented in the third control mode, while steps S304 and S305 are implemented in the sixth control mode. The switch depends on the decision in step S302. In the third and sixth control modes, the motor 43 is stopped because there is no need for the belt 31 to be wound up by the belt reel 42.

In step S301 in the subroutine shown in FIG. 9, a decision is made as to whether or not the driving of the actuator 39 is complete. In the initial stage, the driving is not complete, and steps S302 to S305 are therefore implemented.

First, a decision is made in step S302 as to whether or not the control mode flag Fm is 3. If it is determined in step S302 that "Fm=3," the third control mode is selected from the third and sixth control modes. In this case, the actuator 39 is drivably controlled in step S303 so that the lap belt 31b is pulled in the direction of the arrow Re in a retraction amount Y3 by the belt retraction part 38. The retraction amount Y3 is a value automatically set according to the size of the acceleration rates αxr, αyr and the extent of the possibility of a collision, for example. The retraction amount Y3 may also be a specified value set in advance.

When it is determined in step S302 that "Fm≠3," the sixth control mode is selected from the third and sixth control modes. In this case, the actuator 39 is stoppably controlled in step S304.

Next, the actuator 39 is returnably controlled in step S305 so as to return the belt retraction part 38 to the belt-pulling standby position (starting point). Furthermore, the power transmission between the motor 43 and the belt reel 42 is dispelled by rotating the motor 43 in reverse (rotatably controlling in the belt-puffing direction), similar to the return control. In other words, the clutch mechanism (not shown) is disengaged (deactivated).

The driving of the actuator 39 is thereafter completed while the subroutine shown in FIG. 9 is being repeated, and it is therefore determined in step S301 that the retraction driving of the actuator 39 is complete.

After step S301, S303, or S305 has been implemented, the subroutine shown in FIG. 9 is ended, and the process returns to step S24 or S28 shown in FIG. 5.

The following is a description of the relationship between the retraction amount Y1 of step S103 shown in FIG. 7, the retraction amount Y2 of step S203 shown in FIG. 8, and the retraction amount Y3 of step S303 shown in FIG. 9. The magnitudes of the retraction amounts Y1, Y2, and Y3 are set so as to have the relationship "Y1>Y2≠Y3," for example. The retraction amounts Y1, Y2, and Y3 may also all be set to the same amounts.

Figure 10:
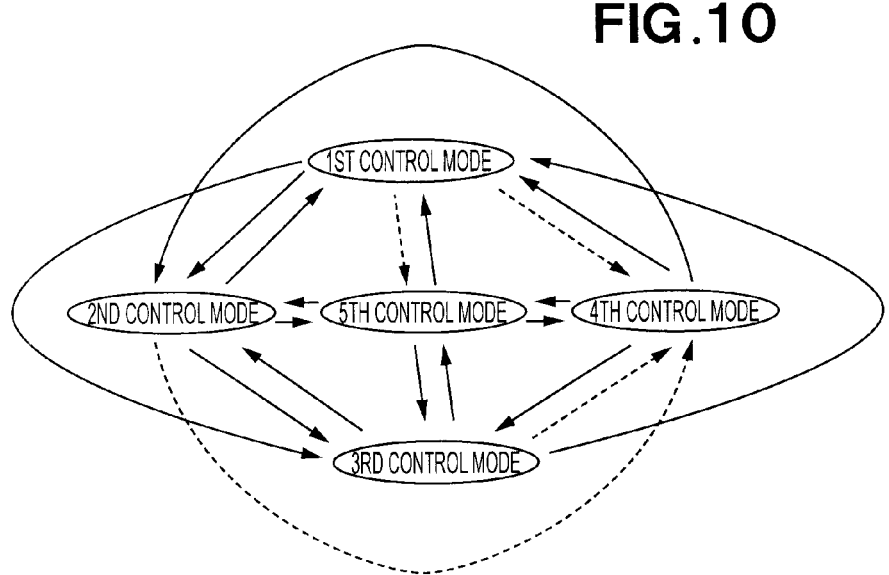
FIG. 10 is a schematic view illustrating the transitional states of the action of the belt state monitoring control of FIG. 5.

The following is a description, made with reference to FIG. 10, of the transitional relationship between the six control modes shown in FIG. 5. The sixth control mode is not described because it is in effect when the motor 43 and the actuator 39 have been stopped; i.e., during the usual state in which the belt 31 does not operate.

FIG. 10 shows the manner in which the first, second, third, fourth, and fifth control modes transition to another control mode in accordance with the traveling state of the vehicle 10 as detected by the traveling state detector 79. Particularly, the following transitions (1) through (3) are shown by the dotted lines. In the case of the transitions (1) through (3), these transitions accompany the action of the lap belt 31b being returned to its original position by the belt retraction part 38, and the winding amount by which the shoulder belt 31a is wound by the belt reel 42 is therefore greater in comparison with other cases.

(1) A case of transitioning from the first control mode to the fourth control mode or the fifth control mode.

(2) A case of transitioning from the second control mode to the fourth control mode.

(3) A case of transitioning from the third control mode to the fourth control mode.

The following is a summary of the above description.

The controller 81 sets a plurality of control modes (steps S18, S20, S22, S24, S26, and S28 in FIG. 5) in advance for controlling the motor 43 and the actuator 39 in accordance with the traveling state detected by the traveling state detector 79 (steps S11 to S16 in FIG. 5), selects one control mode (steps S11 to S16) corresponding to the traveling state from among the plurality of control modes, and implements the one selected control mode.

The control modes (step S18, S20, S22, S24, S26, and S28) include a full drive control mode (the first control mode of step S18) for drivably controlling both the motor 43 and the actuator 39, a motor drive control mode (the fourth control mode of step S26) for drivably controlling only the motor 43, and an actuator drive control mode (the third control mode of step S24) for drivably controlling only the actuator 39.

Therefore, both the motor 43 and the actuator 39 can be driven, the motor 43 alone can be driven, or the actuator 39 alone can be driven, according to the traveling state of the vehicle 10 as detected by the traveling state detector 79.

For example, both the slack in the belt 31 on the shoulder of the vehicle occupant Mn and the slack in the belt 31 on the lap can be quickly taken in by driving both the motor 43 and the actuator 39, and the shoulder and lap can be reliably restrained. Furthermore, the motor 43 and the actuator 39 can be controlled so that the amount of the belt 31 wound by the belt reel 42 and the amount of the belt 31 pulled by the belt retraction part 38 are mutually different.

By driving only one of either the motor 43 or the actuator 39, it is possible for either only the belt 31 to be wound by the belt reel 42 or the belt 31 to be retracted by the belt retraction part 38. As a result, the restraining force of the belt 31 on the shoulder and the restraining force of the belt 31 on the lap can be made to differ from each other. Further, since either the belt 31 is only wound up by the belt reel 42 or the belt 31 is only retracted by the belt retraction part 38, it is possible to reduce the amount by which the entire belt 31 moves (the wound amount or the pulled amount) depending on the operative conditions.

Thus, the slack in the lap belt 31b is sufficiently taken in according to the traveling conditions of the vehicle 10, whereby it is possible both to increase the capacity for protecting the vehicle occupant by the seatbelt device 30 and maintain a comfortable ride for the vehicle occupant Mn.

The controller 81 selects and implements either the motor drive control mode (the fourth control mode of step S26 in FIG. 5) or the actuator drive control mode (the third control mode of step S24 in FIG. 5), in accordance with the turning direction (step S14 in FIG. 5) detected by the turning direction detector 73 (the steering amount detector 73).

Therefore, either the motor 43 alone is driven or the actuator 39 alone is driven depending on the turning direction of the vehicle 10 as detected by the turning direction detector 73. Particularly, in the case of a so-called three-point support seatbelt device 30 in which the belt 31 is supported by three anchors, the effect of restraining the vehicle occupant Mn by the belt 31 differs depending on the turning direction of the vehicle 10.

It is thus possible to selectively switch between winding in the belt 31 by the belt reel 42 and retracting the belt 31 by the belt retraction part 38 in accordance with the turning direction. Therefore, changes in the posture of the vehicle occupant Mn that accompany turning of the vehicle 10 can be effectively suppressed.

The controller 81 switchably controls the actuator 39 from the driven state to the stopped state (steps S302 and S304 through S305) in accordance with changes in the traveling state of the vehicle 10 (steps S11, S28 of FIG. 5). Moreover, the controller 81 is configured so as to increase the rotational speed of the motor 43 (steps S105 through S106 in FIG. 7 and steps S205 through S206 in FIG. 8) in cases in which the motor 43 is drivably controlled (the fourth control mode of step S26 and the fifth control mode of S20) corresponding to the traveling state after switching.

Therefore, the controller 81 switchably controls the actuator 39 from the retraction driving state to the stopped state in accordance with changes in the traveling state of the vehicle 10. There may also be cases in which the controller 81, in accordance with changes in the traveling state of the vehicle 10, drivably controls the actuator 39 so as to return the belt retraction part 38 to its original position (starting point) after the belt retraction part has momentarily performed the retracting action (steps S302 and S304 through S305 in FIG. 9). In this case, there may be slack in the belt 31 toward the belt reel 42 (in the shoulder belt 31a).

In the present embodiment, the controller 81 then performs control in accordance with the subsequent traveling state so as to increase the rotational speed of the motor 43 in cases in which the motor 43 is drivably controlled so as to wind in the belt. Therefore, the belt 31 can be wound up even faster by the belt reel 42. Consequently, slack in the belt 31 occurring toward the belt reel 42 can be quickly dispelled.

In cases in which an acceleration rate $\alpha xr$ exceeding a predetermined lock reference acceleration rate $\alpha xs$ occurs in the vehicle 10 as shown in FIG. 3, the lock mechanism 46 locks the belt reel 42 so it will not rotate in the belt-pulling direction (the direction of the arrow Ru in FIG. 3). In the case that the controller 81 has determined, when the lock mechanism 46 is in a locked state, that the locked state must be released in accordance with a change in the traveling state of the vehicle 10, the actuator 39 alone is drivably controlled in the direction of slackening the belt 31 (steps S35 through S36 in FIG. 6).

The cases in which it has been determined that the locked state must be released in accordance with a change in the traveling state of the vehicle 10 are those in which, after one control mode has been implemented from among the plurality of control modes (first, second, third, fourth, fifth, and sixth control modes), a transition is made to another control mode on the basis of the combined determinations of steps S11 through S16 as shown in FIG. 5.

In other words, the controller 81 implements one control mode from among the first, second, third, fourth, fifth, and sixth control modes (steps S18, S20, S22, S24, S26, and S28 in FIG. 5), in accordance with the traveling state of the vehicle 10 as detected by the traveling state detector 79 (steps S11 through S16 in FIG. 5). The controller 81 thereafter transitions to another control mode (see FIG. 10 as well) in accordance with the traveling state of the vehicle 10 as detected by the traveling state detector 79 (steps S11 through S16). The controller 81 then implements steps S35 through S36 of FIG. 6 every time a transition is made to another control mode. As a result, the lock mechanism 46 either maintains the unlocked state or releases the Locked state.

Therefore, in cases in which the locked state must be released according to changes in the traveling state of the vehicle 10 while the lock mechanism 46 is in the locked state, the actuator 39 alone is driven in the direction of slackening the belt 31. Therefore, for example, the tightening against the lap of the vehicle occupant Mn can be eased. It is easier for the vehicle occupant Mn to move once a period of high acceleration has ended.

In the present invention, the seat 20 and the seatbelt device 30 can have the same configuration in the passenger seat and the rear seats as well.

The belt 31 is not limited to a configuration in which the reversing part 31c is pulled by the belt retraction part 38. In other words, the belt 31 can have a configuration in which a part thereof is retracted by the belt retraction part 38. For example, the configuration may be designed so that the lower anchor 34 is linked to the belt retraction part 38, whereby one end of the belt 31 is retracted by the belt retraction part 38 via the lower anchor 34.

The controller 81 may be configured so as to control some or all of the rotational direction determination unit 56, the rotational angle determination unit 57, and the rotation angle change determination unit 58.

The seatbelt device 30 of the vehicle according to the present invention is suitable for being installed in passenger vehicles and other various vehicles.

Obviously, various minor changes and modifications of the present invention are possible in light of the above teaching. It is therefore to be understood that within the scope of the appended claims the invention may be practiced otherwise than as specifically described.

What is claimed is:

1. A seatbelt device for a vehicle, comprising:
   a belt reel for winding in a belt for restraining a vehicle occupant sitting in a seat;
   a motor for driving the belt reel;
   a belt retraction part;
   an actuator for driving the belt retraction part;
   a traveling state detector for detecting a traveling state of the vehicle; and
   a controller for controlling the motor and the actuator,
   wherein the belt retraction part is designed so as to retract part of the belt in a direction opposite the direction in which the belt is wound up by the belt reel so as to restrain the vehicle occupant,
   the controller includes a plurality of pre-set control modes for controlling the motor and the actuator in accordance with traveling states to be detected by the traveling state detector and is designed to select and implement one of the control modes corresponding to one of the traveling states actually detected by the traveling state detector, and
   the control modes include a full drive control mode for drive-controlling both the motor and the actuator, a motor drive control mode for drive-controlling only the motor, and an actuator drive control mode for drive-controlling only the actuator.

2. The seatbelt device of claim 1, further comprising a turning direction detector for detecting a turning direction of the vehicle, and wherein the controller is designed to select and implement one of the motor drive control mode and the actuator drive control mode in accordance with the turning direction detected by the turning direction detector.

3. The seatbelt device of claim 1, wherein the controller controls the actuator to be switched from a driven state to a stopped state in accordance with a change in the traveling state of the vehicle and controls the motor so that a rotational speed increases when the motor is drive-controlled corresponding to the traveling state of the vehicle after the state switching.

4. The seatbelt device of claim 1, further comprising a lock mechanism for establishing a locked state so that the belt reel is prevented from rotating in a belt-pulling direction when the vehicle accelerates at a rate exceeding a predetermined lock reference acceleration rate, and wherein, when the lock mechanism is in the locked state, the controller drive-controls only the actuator in a belt-slackening direction when a decision has been made that the locked state must be released in accordance with a change in the traveling state.

* * * * *